Sept. 17, 1968          F. JOHNSON          3,401,964

SPHERICAL BEARING MOTION PROGRAMMING MEANS

Filed May 12, 1966          2 Sheets-Sheet 1

INVENTOR
Forest Johnson
BY
Wofford & Felsman
ATTORNEYS

Sept. 17, 1968  F. JOHNSON  3,401,964
SPHERICAL BEARING MOTION PROGRAMMING MEANS
Filed May 12, 1966  2 Sheets-Sheet 2

INVENTOR
Forest Johnson
BY
Wofford & Felsman
ATTORNEYS though there may be some deviation as described above. Thus the motion of the rod end 15 is programmed so that it cannot move in a manner that would cause stress raising grooves in the clevis 27.

United States Patent Office
3,401,964
Patented Sept. 17, 1968

3,401,964
SPHERICAL BEARING MOTION
PROGRAMMING MEANS
Forest Johnson, 501 Oak Park Drive,
Hurst, Tex. 76053
Filed May 12, 1966, Ser. No. 549,702
7 Claims. (Cl. 287—88)

ABSTRACT OF THE DISCLOSURE

An axial load transmitting linkage with spherical bearings supported on a shaft normal to the longitudinal axis of the linkage, at least one of the surfaces of the bearings having a circumferentially extending groove that receives a stabilizer element positioned normal to the longitudinal axis of the linkage and normal to the shaft.

---

It is common for each of the housing and rod ends of fluid cylinders, for example, to be supported by a spherical bearing or ball joint which in turn is supported by a pin or shaft secured by a clevis to a selected structural member. The housing end and the rod end of these fluid cylinders are free to rotate with respect to each other about their mutual longitudinal axis, and in operation, frequently engage structural members such as the clevises which help support them. This often causes the formation of stress raising grooves that can result in fatigue failures, particularly in aircraft since the weight and size of the support structures must be carefully minimized. In the past, attempted solutions to this problem have produced cumbersome or otherwise unsatisfactory results. Moreover, there are other areas where the motions of spherical ball joints should be programmed in a more effective and economical manner.

It is the general object of my invention to provide improved motion programming means for spherical bearings.

Another object of my invention is to provide improved motion programming means for spherical bearings to limit the otherwise unrestricted movements of the raceway members to predetermined and beneficial paths.

Another object of my invention is to provide improved motion programming means for self-aligning bearings.

These and other objects of my invention are effected as will be apparent from the following description taken in accordance with the accompanying drawings, forming a part of this application, in which.

Figure 1:
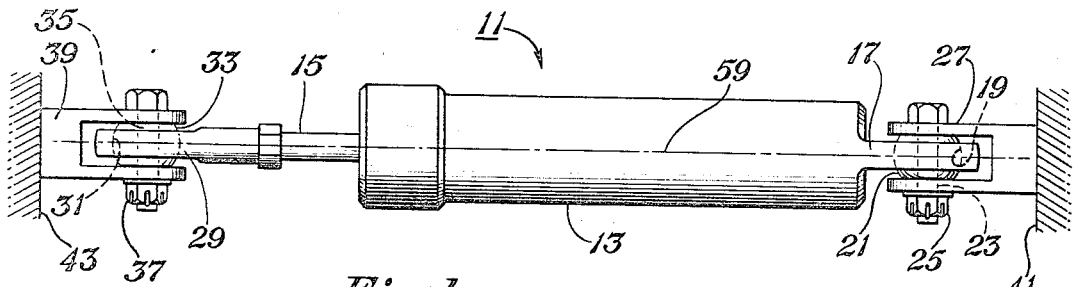
FIG. 1 is a plan view of a typical fluid cylinder secured by means of spherical bearings, fastener means and clevises to selected support structures.

Referring initially to FIG. 1, the numeral 11 designates a fluid cylinder which has a housing end 13 and a rod end 15. The housing end 13 has a protrusion 17 formed thereon which has an aperture 19 therein for receiving a spherical bearing. A pin 23 extends through the spherical bearing and is secured by fastener means 25 to a clevis 27.

Similarly, the rod end 15 has a protrusion 29 with an aperture 31 extending therethrough which receives a spherical bearing 33. Extending through the spherical bearing is a shaft 35 which is secured by fastener means 37 to a clevis or structural connector 39. The clevises 27, 39 are secured to selected structural members 41, 43 which may be portions of an aircraft frame that are selectively movable relative to each other.

Figure 2:
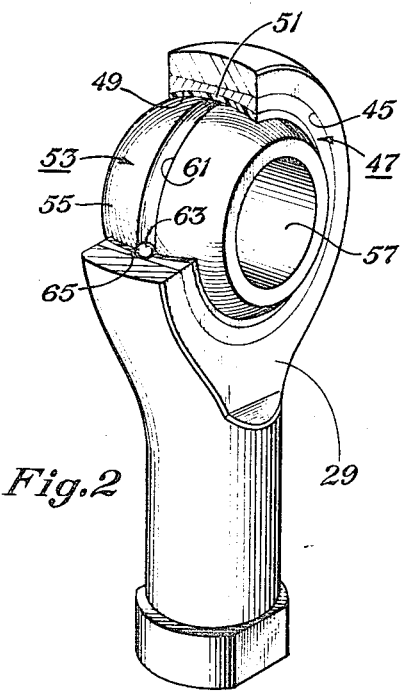
FIG. 2 is a perspective view of the rod end of the FIG. 1 apparatus with a fragment thereof broken away to expose motion programming means formed on the spherical bearings in accordance with the principles of my invention.

A perspective view of the rod end 15 is shown in FIG. 2, which illustrates the rod end as having a substantially cylindrical opening 45 extending therethrough in which is press-fitted an outer race member 47. This outer race member has a truncated, spherical inner surface 49 which in this instance receives an annular "Teflon" or other suitable member 51 for the purpose of reducing friction. An inner race member 53 has a truncated, spherical outer surface 55 which engages the "Teflon" 49 as shown. A cylindrical aperture 57 is formed through the inner race member 53 and defines the central axis which receives the shaft 35 as shown in FIG. 1.

As described thus far, the spherical bearing formed by the inner and outer race members 47, 53 has universal movement and thus the rod end 15 and the housing end 13 are free to rotate with respect to each other along their mutual longitudinal axis 59. It is this rotation between the housing end and the rod end that enables edges of protrusion 17, 29 to engage the inner surfaces of clevises 27, 39 to form stress raising grooves therein. While in some applications the formation of such stress raisers would be seemingly insignificant, in some fields such as the manufacture of aircraft weight must be very carefully minimized. The appearance of stress raisers in the structural members can lead to early fatigue failures with sometimes disastrous results.

My solution to this problem is to form an annular, circumferentially extending groove 61 (see FIG. 2) around the periphery of the spherical outer surface 55 of the inner race members 53. This groove may extend for three hundred sixty degrees around the inner race member and is symmetrical about a plane perpendicular to the central axis of the inner race member. The groove 61 in effect forms a cam surface, and a cam follower or stabilizer element (here in the form of a ball 63) is inserted in an indentation or aperture 65 that is formed through the outer race member 47 perpendicular to the longitudinal axis 59 of the fluid cylinder.

The cam follower 63 must be secured in the aperture 65 so that it partially extends into and is retained in the annular groove 61. Preferably, a similar stabilizer element is located one hundred eighty degrees opposite (homocentric with) the stabilizer element shown in FIG. 2. Thus, the inner race member 53 can rotate freely about the central axis defined by the cylindrical aperture or opening 57 and can rotate about an axis defined by the mutually opposed cam followers 63.

Referring again to FIG. 1, the above described stabilizer elements 63 are positioned to be above and below the protrusion 29 as viewed in FIG. 1, thereby allowing rotation of the raceways with respect to each other about the axis defined by shaft 35 and allowing some deviation of the rod end 15 from the longitudinal axis 59 but preventing rotation of the rod end about the longitudinal axis 59, Thus, the edges of the rod end 15 and also the edges of the protrusions 17 of the housing end 13, if similarly modified, will not rotate into the clevis 39 or the clevis 27 and will effectively prevent the formation of stress raisers.

Figure 3:
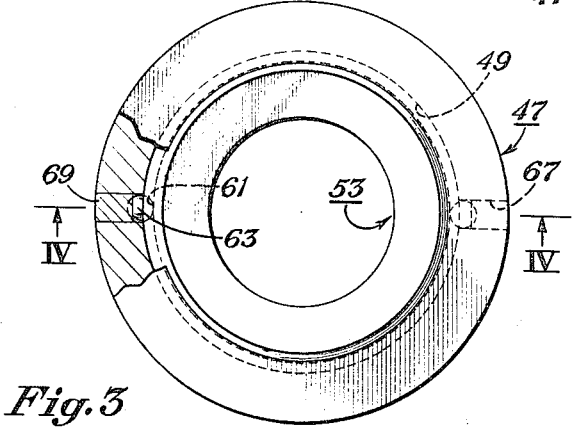
FIG. 3 is a side elevational view of a modified form of spherical bearing motion programming means.
Figure 4:
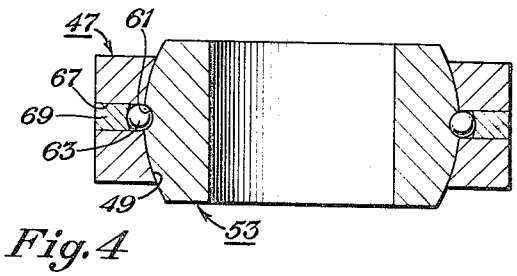
FIG. 4 is a cross sectional view as seen looking along the lines IV—IV of FIG. 3.
Figure 7:
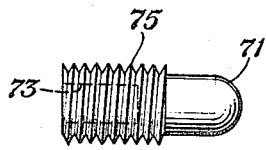
FIG. 7 is a modified form of stabilizer element with an integral retainer means.

FIGS. 3 and 4 show a modification of the apparatus of FIG. 2. Here, the inner race member 53 has an annular (circumferentially extending) groove or a cam surface 49 formed therein like the device of FIG. 2, and the outer race member 47 has an aperture 67 that extends therethrough. In this instance, however, there is no "Teflon" sleeve and the stabilizer element 63 (here a ball) extends into the annular groove 61 and is retained therein by a retainer means 69. The retainer means in this instance is a dowel which is press fitted into the aperture 67, but which can have a number of other forms. In FIG. 7 is shown, for example, a fastener means having one extremity 71 in the form of a cam follower, the other extremity 73 having an Allen socket head, and a mid-region 75 threaded to engage mating threads in the aperture. In FIGS. 3 and 4 there are a pair of homocentric (i.e., on the same axis) stabilizer elements 63 and thus a pair of retainer means 69. In FIG. 3 it may be seen that the groove 61 extends for three hundred sixty degrees around the periphery of the spherical surface of the inner race member 53.

Figure 5:
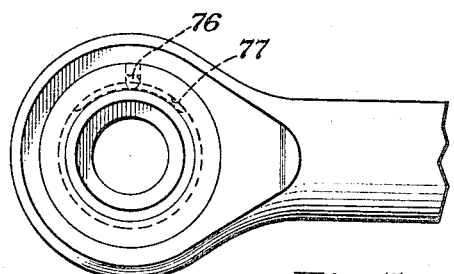
FIG. 5 is a fragmentary view of a rod end of a modified form of motion programming means associated with a spherical bearing.

It is not essential that two oppositely disposed stabilizer elements be utilized, and in FIG. 5 is shown an embodiment of my invention in which only one stabilizer element 76 is utilized. The stabilizer element may be of one of the types previously illustrated and extends into a groove 77 formed only partially around the periphery of the inner race member. This embodiment is practicable since three hundred sixty degree rotation is not required.

Figure 6:
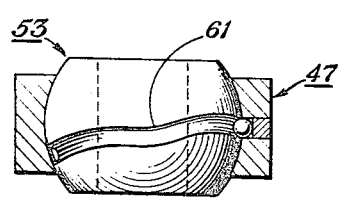
FIG. 6 is a view partially in section of a modified form of spherical bearing with motion programming means.

From FIG. 6 it may be seen that the annular groove 61 may have a variety of geometric forms, since it is not essential that it be symmetrical about a plane perpendicular to the central axis of the ball joint. Grooves of the type shown in FIG. 6 are used to program somewhat unusual rotational movements of the housing and rod ends of the fluid cylinder about their mutual longitudinal axis.

Figure 8:
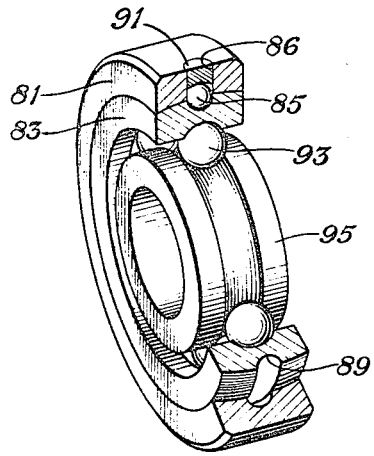
FIG. 8 is a fragmentary perspective view of a self-aligning ball bearing having motion programming means therein in accordance with the principles of my invention.

Referring now to FIG. 8, it may be seen that my invention may be utilized in instances where antifriction bearings, such as ball or roller bearings, are combined with spherical bearings to provide self-aligning bearings. The number 81 in FIG. 8 designates an outer race member of a spherical bearing that engage an inner race member 83. As in the previously described embodiments, a stabilizer element 85 is inserted through an aperture 86 in the outer race member 81 and into a groove or cam surface 89 formed in the inner race member 83. Retainer means 91, here a plug press-fitted into aperture 86, secures the stabilizer element partially within the groove.

Inner race member 83 of the spherical bearing thus far described also serves as the outer race member of a ball bearing having balls 93 confined against an inner ball bearing raceway member 95. Hence, the spherical bearing portion of the combination enables the ball bearing portion thereof to be self-aligning, and yet the stabilizer element restricts the relative movement between the race members of the spherical bearing. Therefore, this embodiment of my invention may be used to advantage in instances where the previously described structures may be used.

Figure 9:
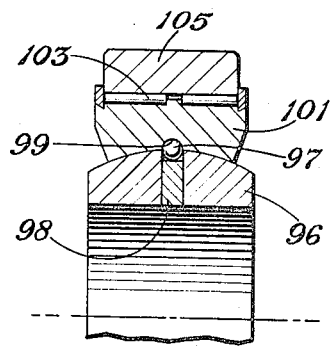
FIG. 9 is a fragmentary cross sectional view of another form of self-aligning bearing also having improved programming means therein.

The previously described forms of my invention have their stabilizer elements retained in the outer race member of the associated spherical bearing. There are instances, however, where the stabilizer element should be retained in the inner race member, as is shown in FIG. 9. Here, the inner race member 96 of a spherical bearing has a stabilizer element 97 secured by retainer means 98 in a mating depression 99 formed in the outer race member 101, which also serves as the inner race member that helps confine needle bearings 103 against an outer race member 105.

The depression 99 need not be an annular groove, but may be only a depression which is, for example, hemispherical in contour. Movement between the outermost race member 105 is accomplished by use of the needle bearing 105. And yet, the use of the stabilizer element 97 restricts the relative movements between the race member 96, 101 to movement about an axis defined by preferably a pair of oppositely disposed (180 degrees apart) stabilizer elements 97. Thus, this form of my invention may be used to obtain results similar with those obtained by previously described structures that use a stabilizer element to follow a groove or cam surface. In other words, the groove or cam surface of the type shown in FIG. 2 may be replaced with an antifriction bearing in FIG. 9 to produce similar results.

Like the forms of my invention having only spherical bearings, the combination spherical, antifriction bearing motion programming means may have the stabilizer element secured to the outermost race member instead of the innermost member. For example, the structure of FIG. 8 would be utilized except the groove 89 would be omitted and the stabilizer element 85 inserted into a mating hemispherical depression instead.

It should be apparent from the foregoing that I have provided an invention having significant advantages. I have provided improved programming means that may be used, for one example, to prevent the rotation of the housing end and the rod end of a fluid cylinder about their mutual longitudinal axis. My improved programming means is provided by adapting the spherical bearings associated with such cylinders with means that may be economically provided. Thus, I have eliminated the necessity for using additional structural members that are disposed on the exterior of the rod or housing ends of the fluid cylinders, or for the necessity of providing anti-rotation pads, which are commonly used. Thus, my motion programming means do not add to the weight of the structure, which is a significant advantage particularly in the aircraft industry.

While I have shown my invention in only a few of its forms, it should be apparent to those skilled in the art that it is not so limited, but is susceptible of various changes and modifications without departing from the spirit thereof. For example, the stabilizer elements and the cam surfaces can have a variety of geometries and are not limited to those selected for illustration and description. Similarly, there are a number of retainer means which may be used to secure the stabilizer element in position.

My invention is not limited to use in fluid cylinders but may be applied equally advantageously to program selected motions into the spherical or self-aligning bearings of essentially any mechanical actuators, such as screwjacks, mechanical linkages or mechanisms.

I claim:

1. In an axial load transmitting linkage arrangement comprising:
    (a) one end of said linkage having an aperture substantially perpendicular to the longitudinal axis of the linkage, said aperture having a truncated, spherical surface in the form of an outer, spherical bearing race member;
    (b) an inner, spherical bearing race member having a truncated, spherical surface inserted within the outer, spherical bearing race member, said inner race member having an opening transverse to the longitudinal axis of the linkage;
    (c) a selected one of said race members having a cam groove formed in its spherical surface to extend at least a portion of the way around its periphery;
    (d) the other of said race members having an indentation formed perpendicular with the longitudinal axis of the linkage and extending into communication with said groove;
    (e) a stabilizer element secured in said indentation and extending into said groove;
    (f) a shaft confined within the opening of the inner race member; and (g) a rigid structural connector secured to said shaft.

2. The linkage defined by claim 1 wherein two homocentric apertures are formed through said outer race member one hundred eighty degrees apart and a cam follower is secured in each aperture to extend into a region of said groove.

3. The linkage defined by claim 2 wherein said groove is formed for three hundred sixty degrees around the periphery of the associated spherical surface and symmetrically about a plane that is perpendicular to the central axis of the grooved race member.

4. The linkage defined by claim 1 wherein the cam groove is formed in the spherical surface of the inner race member, and the stabilizer element is carried by the outer, spherical bearing race member.

5. The invention defined by claim 4 wherein two homocentric apertures are formed through said outer race member one hundred eighty degrees apart and a cam follower is secured in each aperture to extend into a region of a groove formed in said inner race member.

6. The invention defined by claim 4 wherein said groove is formed for three hundred sixty degrees around the periphery of the outer spherical surface of said inner race member and symmetrically about a plane that is perpendicular to the central axis of said inner race member.

7. In an axial load transmitting linkage arrangement comprising:
(a) one end of said linkage having an aperture substantially perpendicular to the longitudinal axis of the linkage, said aperture having a truncated, spherical surface in the form of an outer, spherical bearing race member;
(b) an inner, spherical bearing race member having a truncated, spherical surface inserted within the outer, spherical bearing race member, said inner race member having an opening transverse to the longitudinal axis of the linkage;
(c) a selected one of said race members having a cam groove formed in its spherical surface to extend at least a portion of the way around its periphery;
(d) the other of said race members having an indentation formed perpendicular with the longitudinal axis of the linkage and extending into communication with said groove;
(e) a stabilizer element secured in said indentation extending into said groove;
(f) an antifriction bearing raceway formed in a selected one of said spherical bearing race members to form one antifriction bearing raceway member;
(g) antifriction bearing elements engaging said antifriction bearing raceway;
(h) another antifriction bearing raceway member assembled with and engaging said antifriction bearing elements;
(i) a shaft confined within the opening of the inner race member; and
(j) a rigid structural connector secured to said shaft.

References Cited

UNITED STATES PATENTS

| | | | |
|---|---|---|---|
| 225,103 | 3/1882 | Deschamps | 287—87 |
| 403,086 | 5/1889 | Blessley | 308—183 |
| 1,376,437 | 5/1921 | Hood | 64—7 |
| 1,425,082 | 8/1922 | Farrell | 287—87 X |
| 1,612,047 | 12/1926 | Owens | 287—87 X |
| 1,685,859 | 10/1928 | Noel | 64—7 |
| 2,094,901 | 10/1937 | Monzee | 64—7 |
| 2,767,034 | 10/1956 | McCloskey | 308—72 |
| 2,769,674 | 11/1956 | Neuffer | 308—183 |
| 3,059,948 | 10/1962 | Thompson | 287—87 X |
| 3,076,323 | 2/1963 | Aucktor | 308—188 X |
| 3,168,014 | 2/1965 | Aslan | 92—118 |

FOREIGN PATENTS

| | | |
|---|---|---|
| 637 | 2/1882 | Great Britain. |
| 242,532 | 11/1925 | Great Britain. |
| 714,568 | 9/1954 | Great Britain. |
| 882,785 | 7/1953 | Germany. |

MARTIN P. SCHWADRON, *Primary Examiner.*

L. L. JOHNSON, *Assistant Examiner.*